United States Patent [19]

Mann et al.

[11] 4,305,359

[45] Dec. 15, 1981

[54] DEVICE FOR THE TRANSMISSION OF THE POSITION OF A CONTROL ELEMENT, ACTUATABLE BY THE VEHICLE DRIVER, CONTROLLING THE TRAVELING SPEED OF A MOTOR VEHICLE

[75] Inventors: Arnold Mann, Bieber; Bernhard Stier, Kelkheim-Fischbach, both of Fed. Rep. of Germany

[73] Assignee: VDO Adolf Schindling AG, Frankfurt am Main, Fed. Rep. of Germany

[21] Appl. No.: 72,743

[22] Filed: Sep. 5, 1979

[30] Foreign Application Priority Data

Sep. 11, 1978 [DE] Fed. Rep. of Germany ....... 2839467

[51] Int. Cl.³ .............................................. F02D 17/04
[52] U.S. Cl. ..................................... 123/333; 123/335; 123/361; 123/399; 123/198 DB; 123/198 DC
[58] Field of Search ............... 123/325, 333, 335, 361, 123/397, 399, 395, 198 D, 198 DB, 198 DC

[56] References Cited

U.S. PATENT DOCUMENTS

| | | | |
|---|---|---|---|
| 3,722,491 | 3/1973 | Maeda | 123/198 D |
| 3,722,492 | 3/1973 | Shibata | 123/198 DB |
| 4,083,267 | 4/1978 | Raaz | 123/325 |
| 4,111,167 | 9/1978 | Conley | 123/333 |
| 4,112,885 | 9/1978 | Iwata et al. | 123/361 |
| 4,188,926 | 2/1980 | Fleischer | 123/361 |

*Primary Examiner*—Charles J. Myhre
*Assistant Examiner*—Andrew M. Dolinar
*Attorney, Agent, or Firm*—Martin A. Farber

[57] ABSTRACT

A device for the transmission of the position of a control element, particularly a gas pedal, (which control element is actuatable by the vehicle driver and controls the traveling speed of a motor vehicle, the gas pedal being connected with an electrical position encoder), to an actuator via electrical transmission means, the actuator being coupled with a regulating member, particularly a throttle valve, which member controls the fuel-air mixture of an internal combustion engine. A pedal contact is coupled with the control element, a regulating member contact is coupled with the regulating member and the pedal contact and the regulating member contact are arranged in a logic circuit arrangement (the logic circuit arrangement being connected with a unit that brings about a rotational speed reduction of the internal combustion engine), such that the rotational speed is reduced with a non-actuated control element, but with a simultaneous position of the member that controls the fuel-air mixture in the gas position.

10 Claims, 4 Drawing Figures

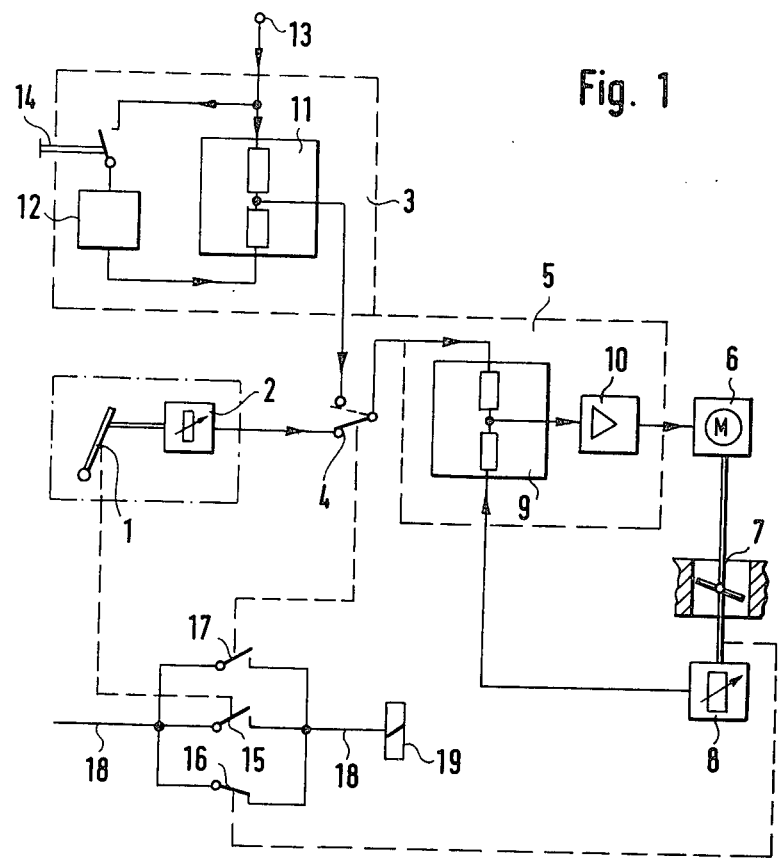
Fig. 1
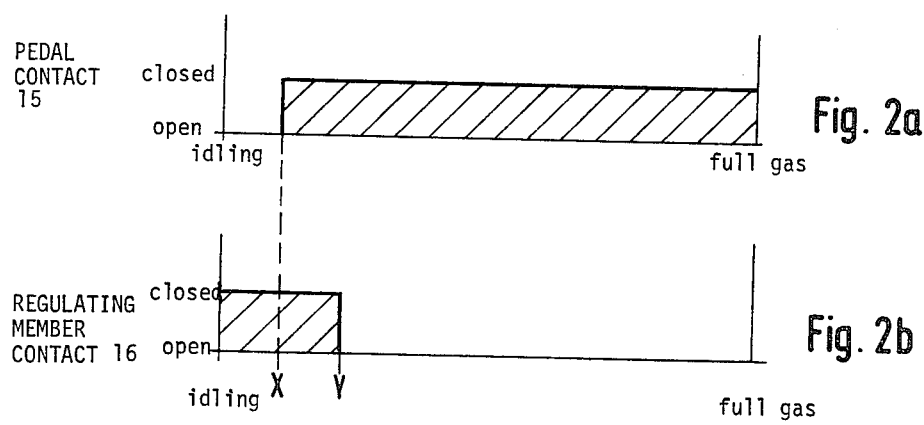
Fig. 2a
Fig. 2b

DEVICE FOR THE TRANSMISSION OF THE POSITION OF A CONTROL ELEMENT, ACTUATABLE BY THE VEHICLE DRIVER, CONTROLLING THE TRAVELING SPEED OF A MOTOR VEHICLE

The invention relates to a device for the transmission of the position of a control element, particularly a gas pedal, (which control element is actuatable by the vehicle driver and which controls the traveling speed of a motor vehicle, the gas pedal being connected with an electrical position indicator or encoder) to an actuator via electrical transmission means, the actuator being coupled with a member, particularly a throttle valve, which member controls the fuel-air mixture of an internal combustion engine.

Such devices are known for the purpose of being able to transmit the gas pedal position to the throttle valve of a carburetor without a mechanical linkage or a Bowden cable. In this manner a cabling (which is possibly or under certain circumstances difficult) of these mechanical transmission elements in the motor vehicle is avoided, since the transmission path is bridged by an electrical line. The electrical transmission of the gas pedal position is also advantageous insofar as it requires no overcoming of frictional forces, which can be caused by the mechanical transmission elements. Rather the restoring force or resiliency of the gas pedal, which here is coupled with an electrical position indicator or position encoder, can be selected at will or as desired within wide limits.

Instead of or in addition to the device for the transmission of the position of a gas pedal to a throttle valve, an automatic electrical speed controller can be provided, which speed controller compares the prevailing rotational speed of an internal combustion engine as an actual value with a pregiven and stored desired value, whereby the actual value and the desired value are present as voltages. The differential or difference voltage then is led via a control amplifier to an actuator for the actuation of the throttle valve. In connection with this electrical speed controller at least one contact is provided, which contact makes the speed controller inoperative, or respectively turned-off, upon actuation of the brake and/or clutch, in order to be able to control the traveling speed again in dependency on the gas pedal position and to be able to vary the constant vehicle speed, which is controlled by the controller.

Although the device for transmission of the gas pedal position and the electrical speed controller per se operate reliably, exceptional cases of disturbance may conceivably occur in which the internal combustion engine turns higher than corresponds to the position of the gas pedal and/or to the desired speed of the motor vehicle. These cases of disturbance can lead to faulty or improper reactions in cases of inexperienced vehicle drivers, so that these cases of disturbance should be avoided with even greater certainty than is guaranteed by the design of the transmission means and of the electrical speed controller, which in themselves are reliable in operation.

The present invention is based on the task of developing a device for the transmission of the position of a control element which controls the driving speed of a motor vehicle, which device can be combined with an electrical controller, such that the operational safety is increased, in the manner that upon cases of disturbance the rotational speed of the internal combustion engine is reduced or the internal combustion engine is completely stopped.

With the above and other objects and advantages in view, the present invention will become more clearly understood in connection with the detailed description of preferred embodiments, when considered with the accompanying drawings, of which:

FIG. 1 is a schematic arrangement of the device in accordance with the invention for transmission of the position of the gas pedal to a throttle valve, combined with a speed controller and with a safety device;

FIGS. 2a and 2b are graph block diagrams which illustrate the position of the switching points, of the pedal contact and of the regulating member contact.

Figure 3:
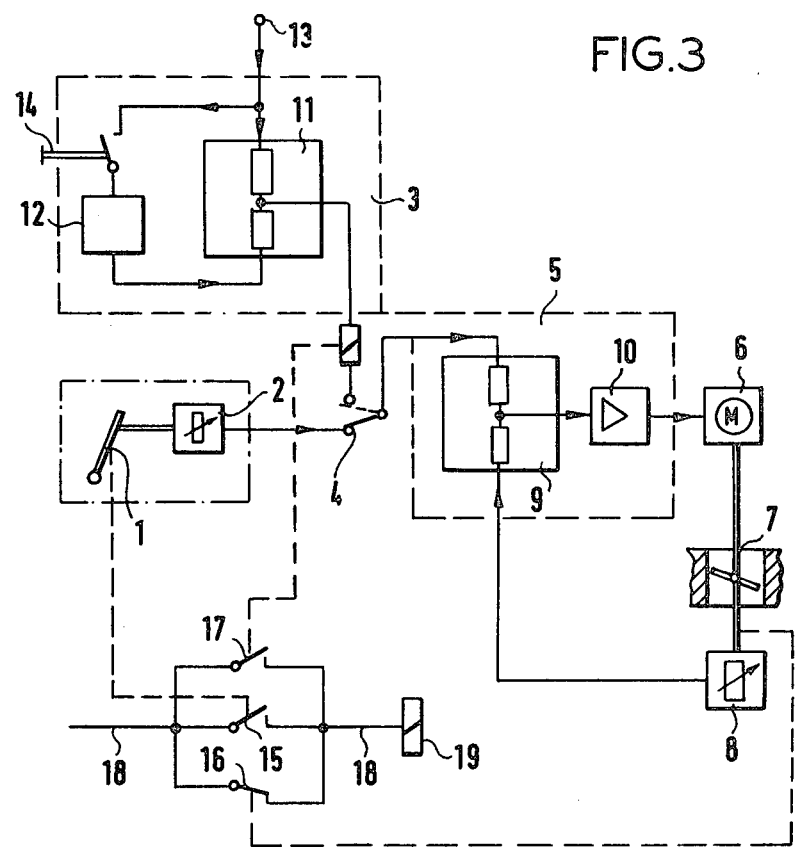
FIG. 3 is a schematic arrangement of a delayed actuated contact.

This task is aided in its solution in accordance with the invention in the manner that a pedal contact (15) is coupled with the control element (e.g. gas pedal 1), a regulating member contact (16) is coupled with the regulating member (e.g. throttle valve 7) and the pedal contact (15) and the regulating member contact (16) are arranged in a logic circuit arrangement (which logic circuit arrangement is connected with a unit [e.g. fuel pump relay 19], which unit causes a rotational speed reduction of the internal combustion engine) such that with a non-actuated control element, but with a simultaneous position of the member that controls the fuel-air mixture in the gas position, the rotational speed is reduced.

Consequently the important or essential advantage is obtained in that always when the member which controls the fuel-air mixture is in a position which does not correspond to the position of the control element, or respectively of the gas pedal, which can occur only in the case of disturbance, the rotational speed of the internal combustion engine is reduced without additional action on the part of the vehicle driver. In this manner in spite of the disturbance the vehicle assumes a condition of operational safety and in all probability of traffic safety. If no disturbance exists, the function of the device for the transmission of the position of the gas pedal to the throttle valve is unaffected by the safety device. The safety device comprises thus the pedal contact and the regulating member contact, which contacts are combined with one another in a logic circuit arrangement and act on a member that reduces the rotational speed upon a certain output signal of the logic circuit arrangement. The output signal, for example, can be a voltage which in the case of a disturbance assumes the value 0, so that the fuel supply to the internal combustion engine is interrupted or the ignition is turned-off. With this safety device the fuel supply thus only then takes place normally or the ignition only is in operation in the usual manner when either the throttle valve is in its idling position, independent of the position of the gas pedal, or if the gas pedal is in its gas position—outside of the idling position.

The logic circuit arrangement in a different manner can be realized as a logical OR circuit or switching logic operation.

For this purpose it is advantageous in a variation of the invention to equip the device with the features: the pedal contact (15) is constructed as a closure or normally open contact, which contact is closed with an actuated control element (gas pedal 1), the regulating member contact (16) is constructed as a normally closed contact (NCC) which is open in the gas position of the regulating member (the throttle valve 7), and the pedal contact (15) and the regulating member contact (16) are arranged parallel to one another in a line (18), which line is closed for the normal operation of the internal combustion engine.

With this particularly inexpensive realization of the device, current is fed to the closed line by one of the two switches only when either the gas pedal is in the gas position or the throttle valve is in the idling position.

In a suitable embodiment a fuel pump relay (19) as the unit which reduces the rotational speed is connected to the line (18), which line (18) constitutes the output line of the logic circuit arrangement. This line is thus without current in the event of disturbance so that no additional fuel is supplied to the carburetor or to the fuel injection pump of the internal combustion engine and the rotational speed is reduced correspondingly up to the standstill or stopping of the internal combustion engine. This measure has the advantage that the internal combustion engine is not suddenly completely put out of service, so that the vehicle driver has the opportunity to adjust to the disturbance situation, or respectively under certain circumstances, even to take counter measures: letting go or releasing the gas pedal.

A further formation or improvement concerns a device with an automatic electrical speed controller and at least one actuating element for turning-on the speed controller instead of the control element which controls the vehicle speed, which control element is actuated by the vehicle driver, characterized in the manner that a speed controller contact (17) is connected with the actuating element (selector or throw-over switch 4), the speed controller contact (17) being arranged in the logic circuit arrangement such that upon simultaneously non-turned-on speed controller (3) and non-actuated control element (gas pedal 1) and position of the member (throttle valve 7) (which member controls the fuel-air mixture) in the gas position, the rotational speed is reduced.

Consequently thus cases of disturbance are also detected and overcome with the presence of an electrical speed controller in the manner that rotational speeds above the idling speed are only allowed when the speed controller is turned on, unless the gas pedal is actuated.

In an improvement of the device of little cost, which is developed for the recognition and overcoming of disturbance situations with the presence of a speed controller, it is provided that the speed controller contact (17) is formed as a normally open contact, which contact is closed with the speed controller (3) turned on and which contact is connected in parallel to the regulating element contact (16).

Consequently thus a logical OR circuit combination or OR operation, is produced, which for the normal operation of the internal combustion engine requires that either the speed controller is turned on or the gas pedal is actuated or the throttle valve is in the idling position. The same OR combination circuit or OR operation, instead of the parallel connection circuit of three switches, can also be realized with a series circuit connection, to which series circuit connection a negation stage or NOT stage is connected, and in which series circuit connection in place of of the normally open contacts, normally closed contacts are provided, and in place of normally closed contacts, normally open contacts are provided.

The devices in which the pedal contact and the regulating member contact are connected in parallel are advantageously constructed in the manner that the regulating member contact (16) is opened only when the regulating member (throttle valve 7) is located in the gas position outside of its idling position by a safety distance section or margin.

Consequently it is achieved that the rotational speed is not reduced when the throttle valve is brought from the idling position into the gas position by actuation of the pedal.

In a similar way, for the device in which a speed controller contact is arranged parallel to the regulating member contact and to the pedal contact, a speed controller contact of such nature is provided that this contact (17) opens with delayed action during or upon switching-off of the speed controller (3).

Consequently no undesired reduction of the rotational speed takes place merely for the reason that the speed controller was just switched off, but one of the other two contacts has not yet assumed a position that corresponds to the normal driving operation.

A particularly radial reduction of the rotational speed in the case of disturbance takes place by the measure that the logic circuit switching arrangement is connected with the ignition unit as the member which reduces the rotational speed.

In FIG. 1 a gas pedal 1 is illustrated which is coupled with an electrical position indicator or encoder (transmitter) 2. The electrical position encoder 2 is connected with an electrical actuator 6 by means of a selector or reversing switch 4 (which switch 4 belongs to or is associated with a speed controller 3) and electrical transmission means 5. The electrical actuator 6 is coupled with a throttle valve 7 as the regulating member.

In turn a position encoder 8 is connected with the throttle valve 7, which position encoder 8 is connected to one input of a comparator 9. A second input of the comparator 9 is electrically connected with the selector switch 4. From the comparator 9 an output line leads to the actuator 6 via an amplifier 10. The comparator 9 and the amplifier 10 belong to the electrical transmission means 5.

The electrical position encoder 2 which is connected with the gas pedal 1, the electrical transmission means 5 and the actuator or servodrive 6 belong to a so-called electric gas pedal.

This device is completed or complemented by the speed controller 3, which speed controller essentially comprises a comparator 11 and a register or memory 12. One input of the comparator 11 in the speed controller is connected with a terminal 13, to which terminal there is applied a voltage proportional to the rotational speed. From the terminal 13 an additional connection leads via a memory contact 14 to the memory 12, in order to store in the memory a desired value corresponding to an instantaneous or momentary speed.

The comparators are each formed of two resistors, the free ends of which are the respective inputs and the common connection point being the output.

The safety device belonging to the device is described further below.

The device for the transmission of the position of the gas pedal 1 to the throttle valve 7 operates in the manner that with a position of the selector switch 4 in the illustrated position a voltage corresponding to the gas pedal position is tapped-off from the electrical position encoder 2, and is compared in the comparator 9 with a voltage transmitted from the remote position indicator—position encoder 8, according to which the differential or difference voltage is fed to the actuator 6 via the amplifier 10. The actuator 6 is actuated in this manner until the voltage which is transmitted from the position encoder 8 of the regulating member 7 is equal to the voltage transmitted from the electrical position encoder 2. In this case the position of the throttle valve 7 corresponds to a certain or determined gas pedal position, independent of frictional forces and restoring forces on the throttle valve.

For the automatic control of the driving speed the reversing or selector switch 4 is brought into its dashed-line indicated position. In this manner the output of the comparator 11 is connected with one input of the comparator 9. In the speed controller 3, by actuation of the memory contact 14 a desired value is fed into the memory 12, which desired value is compared in the comparator 11 with the prevailing actual value of the speed. The thereby formed differential voltage at the output of the comparator 11 determines or defines an adjustment or regulation of the actuator 6 in the manner that a speed (which is stored in the memory 12 as an electrical value) is maintained by the motor vehicle independent of load variations or fluctuations, particularly on inclines or ascents.

A pedal contact 15 which is constructed as a contact or normally open contact belongs to or is part of the safety device. This pedal contact 15 is mechanically coupled with the gas pedal 1. Moreover a regulating member contact 16 is part of the safety device. This regulating member contact 16 is formed as a breaker or normally closed contact and is connected with throttle valve 7 (the regulating member) in the manner that the contact 16 is closed in the idling position of the throttle valve 7. Further a speed controller contact 17 belongs to the safety device, which speed controller contact is formed as a contact or normally open contact and is coupled with the selector switch 4. The switches 15, 16, 17 are arranged parallel to one another in the course of a line 18, which line 18 leads to the fuel pump relay 19.

The position of the switching points of the pedal contact 15 and of the regulating member contact 16 is illustrated in FIGS. 2a and 2b, respectively. From this it is shown that the regulating member contact 16 is not opened already at the position X when the pedal contact 15 goes into a gas position, but rather only after the regulating member 7 has covered a safety distance or path section up to the position Y. In this manner an overlapping of the closed or connected positions of both switches in the vicinity of the idling position is achieved.

The safety device operates in the manner that the fuel pump relay 19 receives current for the normal supplying of fuel when one of the three switches 15, 16, 17 is closed. For this it is necessary or required that either the throttle valve 7 is in its idling position, whereby the regulating member contact 16 is maintained in its closed position, or that the pedal contact 15 is closed, because the gas pedal 1 is in a gas position, or yet that the speed controller 3 is turned-on, whereby the selector switch 4 is in its dashed line switching position and moreover the speed controller contact 17 is closed.

If on the other hand the throttle valve 7 is not located in its idling position, although the gas pedal is not actuated or respectively the gas pedal is in the idling position and although the speed controller is not turned on, then all the contacts 15, 16, 17 are open and the fuel pump relay 19 receives no current via the line 18, so that the supplying of fuel is stopped and the rotational speed of the internal combustion engine is reduced. Thereby it is impossible for the motor vehicle to be driven with high speed, although neither the gas pedal is actuated nor the speed controller is turned-on.

While there have been described several embodiments of the invention it is to be understood that these embodiments are given by example only and not in a limiting sense.

FIG. 3 shows an embodiment of a delayed actuated contact 17. In this embodiment a relay 20 is used which has deenergizing delaying means. Such relays are well known. When the selector switch 4 is actuated from the drawn position into the dotted position, the relay 20 is energized and the contact 17 is closed without delay. If, however, the speed controller 3 is switched off by reactuating the selection switch 4, the relay 20 is deenergized with a predetermined delay and therefore the contact 17 opens with delay.

A delayed actuation of the contact 16 can be achieved by mechanical means arranged on the shaft of the electrical actuator 6 of a shaft coupled therewith. For example, a mechanical means can be a disc with a cam acting on the contact 16.

We claim:

1. In a device for the transmission of the position of a control element (particularly a gas pedal, which control element is actuatable by the vehicle driver and controls the traveling speed of a motor vehicle, the gas pedal being connected with an electrical position encoder) to an actuator via electrical transmission means, the actuator being coupled with a regulating member, particularly a throttle valve, which regulating member controls the fuel-air mixture of an internal combustion engine, the vehicle including a unit effecting a rotational speed change of the engine, the improvement wherein
a pedal contact is coupled with the control element,
a regulating member contact is coupled with the regulating member,
said pedal contact and said regulating member contact are arranged in a logic circuit arrangement, the latter being connected with the unit, said unit constituting means for effecting a rotational speed reduction of the internal combustion engine,
said pedal contact and said regulating member contact are arranged in said logic circuit arrangement such that the rotational speed of the internal combustion engine is reduced with a non-actuated control element, but with a simultaneous position of the regulating member in a gas position,
said pedal contact is constructed as a normally open contact, said normally open contact is closed with the control element actuated,
said regulating member contact is constructed as a normally closed contact, said normally closed contact is open in the gas position of the regulating member,
a line is connected to said unit,
said pedal contact and said regulating member contact are arranged in parallel to one another in said line, said line is closed for normal operation of the internal combustion engine by at least one of said contacts being closed, said means reducing the rotational speed of the engine when said line is open when all of said contacts are open,
said unit which causes a reduction of the rotational speed is a fuel pump relay connected to said line.

2. In a device for the transmission of the position of a control element (particularly a gas pedal, which control element is actuatable by the vehicle driver and controls the traveling speed of a motor vehicle, the gas pedal being connected with an electrical position encoder) to an actuator via electrical transmission means, the actuator being coupled with a regulating member, particularly a throttle valve, which regulating member controls the fuel-air mixture of an internal combustion engine, the vehicle including a unit effecting a rotational speed change of the engine, the improvement wherein a pedal contact is coupled with the control element, a regulating member contact is coupled with the regulating member, said pedal contact and said regulating member contact are arranged in a logic circuit arrangement, the latter being connected with the unit, said unit constituting means for effecting a rotational speed reduction of the internal combustion engine, said pedal contact and said regulating member contact are arranged in said logic circuit arrangement such that the rotational speed of the internal combustion engine is reduced with a non-actuated control element, but with a simultaneous position of the regulating member in a gas position, with an automatic electrical speed controller and at least one actuating element for operatively turning-on the speed controller instead of the control element, further comprising a speed controller contact operatively connected with the actuating element, said speed controller is arranged in said logic circuit arrangement such that the rotational speed of the engine is reduced upon simultaneously a turned-off speed controller and a non-actuated control element and a position of the regulating member in the gas position.

3. The device as set forth in claim 2, wherein
the actuating element is a selector switch means for operatively connecting either the speed controller or the control element to the electrical transmission means.

4. The device as set forth in claim 2, wherein
said speed controller contact is formed as a normally open contact, said normally open contact is closed with the speed controller operatively turned on, and
said normally open contact is connected in parallel to said regulating member contact and to said pedal contact.

5. The device as set forth in claim 2, wherein
said regulating member contact is opened only when the regulating member is located in the gas position outside of its idling position.

6. The device as set forth in claim 5, wherein
said regulating member contact is opened only when the regulating member is located in the gas position outside of its idling position by a predetermined safety distance margin.

7. The device as set forth in claim 4, further comprising
means for opening said speed controller contact after a delayed time upon turning-off of the speed controller.

8. The device as set forth in claim 2, wherein
said logic circuit arrangement is connected with an ignition unit as the unit which reduces the rotational speed.

9. In a device for the transmission of the position of a control element (particularly a gas pedal, which control element is actuatable by the vehicle driver and controls the traveling speed of a motor vehicle, the gas pedal being connected with an electrical position encoder) to an actuator via electrical transmission means, the actuator being coupled with a regulating member, particularly a throttle valve, which regulating member controls the fuel-air mixture of an internal combustion engine, the vehicle including a unit effecting a rotational speed change of the engine, the improvement wherein a pedal contact is coupled with the control element, a regulating member contact is coupled with the regulating member, said pedal contact and said regulating member contact are arranged in a logic circuit arrangement, the latter being connected with the unit, said unit constituting means for effecting a rotational speed reduction of the internal combustion engine, said pedal contact and said regulating member contact are arranged in said logic circuit arrangement such that the rotational speed of the internal combustion engine is reduced with a non-actuated control element, but with a simultaneous position of the regulating member in a gas position, said pedal contact is constructed as a normally open contact, said normally open contact is closed with the control element actuated, said regulating member contact is constructed as a normally closed contact, said normally closed contact is open in the gas position of the regulating member, a line is connected to said unit, said pedal contact and said regulating member contact are arranged in parallel to one another in said line, an automatic electrical speed controller and at least one actuating element for operatively turning-on the speed controller instead of the control element, a speed controller contact is operatively connected with the actuating element, said speed controller contact is arranged in said logic circuit arrangement such that the rotational speed of the engine is reduced upon simultaneously a turned-off speed controller and a non-actuated control element and a position of the regulating member in the gas position, said speed controller contact is formed as another normally open contact, which another normally open contact is closed with the speed controller operatively turned on, and said another normally open contact is connected in parallel to said regulating member contact and to said pedal contact, said line is closed for normal operation of the internal combustion engine by at least one of said contacts being closed, said means reducing the rotational speed of the engine when said line is open when all of said contacts are open.

10. In a device for the transmission of the position of a control element (particularly a gas pedal, which control element is actuatable by the vehicle driver and controls the traveling speed of a motor vehicle, the gas pedal being connected with an electrical position encoder) to an actuator via electrical transmission means, the actuator being coupled with a regulating member, particularly a throttle valve, which regulating member controls the fuel-air mixture of an internal combustion engine, the vehicle including a unit effecting a rotational speed change of the engine, the improvement wherein a pedal contact is coupled with the control element, a regulating member contact is coupled with the regulating member, said pedal contact and said regulating member contact are arranged in a logic circuit arrangement, the latter being connected with the unit, said unit constituting means for effecting a rotational speed reduction of the internal combustion engine, said pedal contact and said regulating member contact are arranged in said logic circuit arrangement such that the rotational speed of the internal combustion engine is reduced with a non-actuated control element, but with a simultaneous position of the regulating member in a gas position, said logic circuit arrangement is connected with an ignition unit as the unit which reduces the rotational speed.

* * * * *